United States Patent
Halling

(10) Patent No.: US 8,162,327 B2
(45) Date of Patent: Apr. 24, 2012

(54) METAL SEALS FOR WELD-DEFORMED HIGH TEMPERATURE PNEUMATIC DUCTING JOINTS

(75) Inventor: Horace P. Halling, Durham, CT (US)

(73) Assignee: Seal Science and Technology, LLC, Durham, CT (US)

(*) Notice: Subject to any disclaimer, the term of this patent is extended or adjusted under 35 U.S.C. 154(b) by 0 days.

(21) Appl. No.: 12/657,204

(22) Filed: Jan. 15, 2010

(65) Prior Publication Data
US 2010/0181734 A1 Jul. 22, 2010

Related U.S. Application Data

(60) Provisional application No. 61/145,143, filed on Jan. 16, 2009.

(51) Int. Cl.
F16J 15/08 (2006.01)
(52) U.S. Cl. .......... 277/647; 277/650
(58) Field of Classification Search .......... 277/530, 277/644, 647, 650
See application file for complete search history.

(56) References Cited

U.S. PATENT DOCUMENTS

| | | |
|---|---|---|
| 3,192,690 A | 7/1965 | Taylor |
| 3,575,432 A | 4/1971 | Taylor |
| 3,797,836 A | 3/1974 | Halling |
| 4,759,555 A * | 7/1988 | Halling .......... 277/631 |
| 4,784,397 A * | 11/1988 | Tozer .......... 277/644 |
| 4,798,392 A * | 1/1989 | Tozer .......... 277/644 |
| 5,249,814 A | 10/1993 | Halling |
| 5,433,370 A | 7/1995 | Halling |
| 5,630,593 A | 5/1997 | Swensen et al. |
| 5,716,052 A | 2/1998 | Swensen et al. |
| 6,299,178 B1 | 10/2001 | Halling |
| 6,626,440 B2 * | 9/2003 | Halling .......... 277/626 |
| 6,968,615 B1 * | 11/2005 | More et al. .......... 29/888.3 |
| 2002/0020971 A1 * | 2/2002 | Halling .......... 277/654 |
| 2004/0239053 A1 * | 12/2004 | Rowe et al. .......... 277/650 |

FOREIGN PATENT DOCUMENTS

| | | |
|---|---|---|
| GB | 2190154 A * | 11/1987 |
| GB | 2190155 A * | 11/1987 |

* cited by examiner

Primary Examiner — Thomas Beach
Assistant Examiner — Gilbert Lee
(74) Attorney, Agent, or Firm — DeLio & Peterson, LLC; Robert Curcio, Esq.

(57) ABSTRACT

A single-ply sheet metal seal ring with a convoluted, V/E-shaped cross-section having planar-circumferential flexibility is shown to be more capable of conforming to the sealing face contours of warped, weld-deformed flanges than thin layer, multiple-ply seals developed to replace earlier E-shaped seals for this purpose. The basis of the improved flexibility of the new seal lies mainly in the discovery of geometric relationships that permit a reduction in the thickness of the sheet material employed in the construction of the seal while maintaining its pressure containing capabilities.

13 Claims, 9 Drawing Sheets
(4 of 9 Drawing Sheet(s) Filed in Color)

METAL SEALS FOR WELD-DEFORMED HIGH TEMPERATURE PNEUMATIC DUCTING JOINTS

CROSS-REFERENCE TO RELATED APPLICATIONS

This application claims priority to U.S. patent application Ser. No. 61/145,143 filed on Jan. 16, 2009.

BACKGROUND OF THE INVENTION

1. Field of the Invention

The present invention relates to metal seals, and specifically, metal seals used for high temperature pneumatic ducting joints.

2. Description of Related Art

Metal seals for weld-deformed high temperature pneumatic ducting joints are employed to stem leakage in high temperature aeronautical applications, where pressures vary over wide ranges. They are used in many locations where pressures may be high, such as within engine compressor bleed air ducting upstream of a pressure-reducing valve, or where pressures are much lower, downstream of such a device. The bleed pressure also varies in the flight cycle from taxiing to take-off and climb, from high speed cruise to descent, and flight-idle while waiting for a landing slot. Seal leakage in the moderate-to-lower pressure ranges can be a serious concern. Even if direct jet-leakage does not damage non-metallic components, high "under-nacelle temperatures" can cause their premature failure and possibly weaken highly loaded structures. In a jet engine, the nacelle region is generally considered to be composed of the podded engine inlet, fan cowl, thrust reverser, and the exhaust nozzle.

Initial E-shaped seals were described in U.S. Pat. No. 3,192,690, issued to Taylor on Jul. 6, 1965, entitled "SEALING RING WITH E-SHAPED RADIAL SECTION," and U.S. Pat. No. 3,575,432, issued to Taylor in Apr. 20, 1971, entitled "SEALING RING." The former was originally intended for high-pressure hydraulic applications and the latter for sealing pneumatic ducting joints. During qualification testing for an aerospace application, the pneumatic E-Seal was subsequently discovered to be prone to fatigue failure in cyclic pressure and bending moment testing of pneumatic ducting joints.

U.S. Pat. No. 3,797,836 issued to Halling on Mar. 19, 1974, entitled "SEALING RING," teaches an alternative approach where the outer arms of the E-seal have a sinuous configuration. FIG. 1 depicts a pneumatic E-seal of this type.

Ducting manufacturers have continually struggled with maintaining flange face flatness tolerances within the limits defined to meet specified leakage requirements. Multi-ply sealing rings were introduced in an attempt to resolve this problem. A two-ply E-seal was introduced as depicted in FIG. 2 having greater axial height with its free edges sealed together by edge-welding, which permitted larger flatness tolerances.

In U.S. Pat. No. 5,249,814, issued to Halling on Oct. 5, 1993, entitled, "MULTI-PLY SEALING RINGS AND METHODS FOR MANUFACTURING SAME," and in a related divisional patent, U.S. Pat. No. 5,433,370, issued to Halling on Jul. 18, 1995, under the same title, multi-ply sealing rings are taught having two annular members nested one within the other and welded at equidistant intervals to form a plurality of annular weld zones.

The two-ply edge-welded seal, however, was appreciably expensive to produce. A folded-edge two-ply seal was taught in U.S. Pat. Nos. 5,630,593 and 5,716,052, both entitled, "PRESSURE-ENERGIZED SEALING RINGS," and issued to Swensen, et al., on May 20, 1997 and Feb. 10, 1998, respectively. This type of seal is currently sold under the trade name U-PLEX, and is depicted in FIG. 3.

Experience has shown that the two-ply seal has drawbacks that make it unsuitable for its intended application. For instance, in order to avoid seal overstress during installation in the standard deep flange cavity, which is approximately 0.088±0.002 inches, the free-height must be restricted to 0.121±0.003 inches. In contrast, the governing specification for weld-deformed flange surface flatness requires that the seal be able to satisfy leakage limits when the local cavity depth increases to a maximum of 0.126 inches over one (1) inch of circumference.

The seal free-height of the U-PLEX seal expands under pressure-energization to close the gap between itself and the flanges, and consequently form a tight seal. This is well-known, and observed for all resilient metallic seals in pneumatic systems, which eventually cut off or reduce leakage when the energizing pressure differential is sufficiently high enough. Until that threshold is reached, however, leakage from the joint is significant. FIG. 6 is a non-deformed ducting joint with the U-PLEX seal of FIG. 3. In contrast, FIG. 7 is a maximum deformed ducting joint with the same U-PLEX seal. In FIG. 6, there are three points of contact shown with the flange surfaces, one at the top or heel and two on the outside legs. The upper leg contact point is removed upon deformation, as depicted in FIG. 7, and only the lower contact sealing point remains as indicated by the arrows. As shown, deformation compromises the integrity of the seal joint.

Given the industry's tendency towards the multi-ply designs, it did not seem probable that a high quality, cost effective sealing ring produced from a single thickness of material was feasible. For example, in U.S. Pat. No. 6,299,178, issued to Halling on Oct. 9, 2001, entitled, "RESILIENT SEALS WITH INFLECTION REGIONS AND/OR PLY DEFORMATIONS," a single-ply seal with contacting inflexion (internal fulcrum) points had been successfully qualified but its manufacture and implementation was not economically viable.

Moreover, a disadvantage of the prior art designs is the stiffness of the folded back ends (Ref.: FIG. 3), which significantly detracts from the ability of the seal to conform to local depressions in flange sealing surfaces of smaller diameter flanges.

SUMMARY OF THE INVENTION

Bearing in mind the problems and deficiencies of the prior art, it is therefore an object of the present invention to provide a single-ply sheet metal seal ring capable of conforming to the sealing face contours of warped, weld-deformed flanges.

It is another object of the present invention to provide a single-ply sheet metal seal ring with a convoluted, V/E-shaped cross-section having exceptional planar-circumferential flexibility for implementation in warped, deformed flanges.

Another object of the present invention is to provide a metal seal that will contain high temperature air from the lowest operating pressure to the maximum specified for aircraft pneumatic ducting systems.

Still other objects and advantages of the invention will in part be obvious and will in part be apparent from the specification.

The above and other objects, which will be apparent to those skilled in the art, are achieved in the present invention which is directed to a ring shaped convoluted V/E-seal having a cross section with a central axis, a center curved region extending symmetrically across the central axis and a pair of central legs, each central leg having a first end connected to opposing ends of the center curved region and a second end connected to an first end of a bight portion or heel. The seal cross section includes a pair of opposing outer legs, each connected to a second end of the heel and extending away from heel and from the central axis sufficient for the outer legs to contact opposite surfaces of a groove in which the seal is placed. The outer leg includes a leg end portion opposite the heel and forms an angle to the central axis sufficient for opposing leg end portions to span a groove in which the seal is placed. The leg end portion includes a curved portion terminating inward of the outer leg.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-26 of the drawings in which like numerals refer to like features of the invention.

Figure 8:
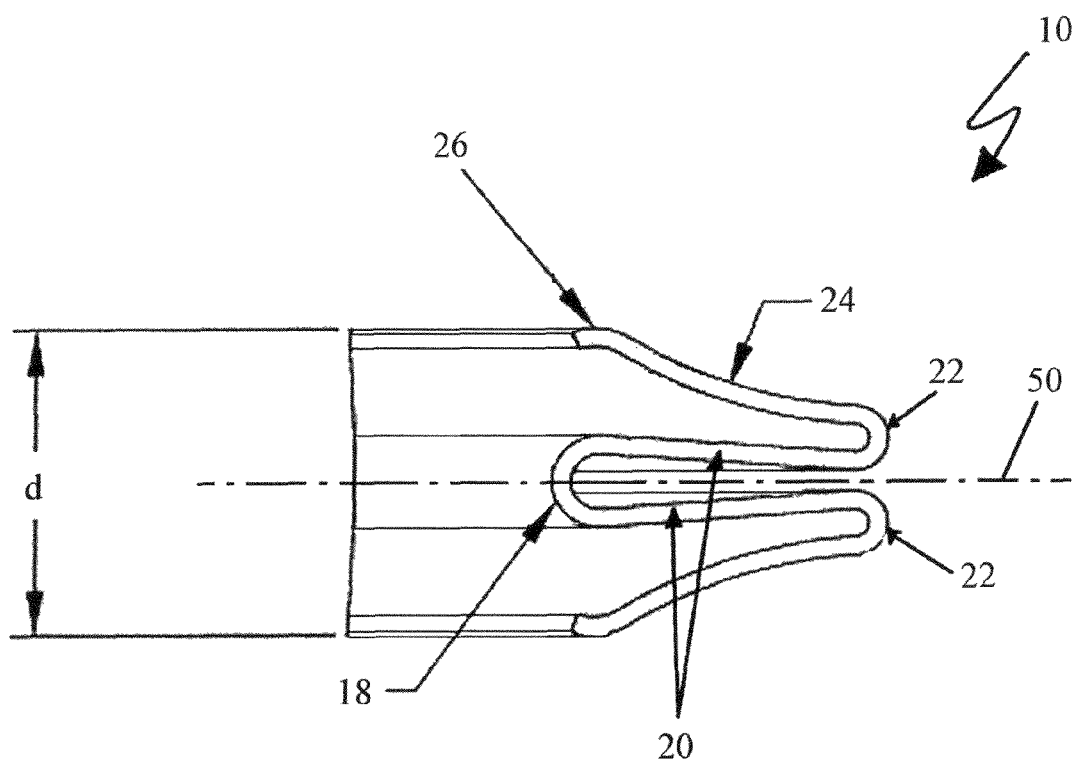
FIG. 8 is a cross-sectional view the V/E-seal according to the present invention.

FIG. 8 shows a seal according to the present invention. The ring shaped convoluted V/E-seal 10 has a cross-section with a central axis 50, a center curved region 18 extending symmetrically across the central axis and a pair of central legs 20, each central leg having a first end connected to opposing ends of the center curved region 18 and a second end connected to a first end of a bight portion or heel 22. The seal cross section includes a pair of opposing outer legs 24 forming a wide V-angle, each connected to a second end of the heel 22, extending away from the heel and from the central axis 50 a distance d/2 sufficient for the outer legs to contact opposite surfaces of a groove 30 (not shown) in which the seal is placed, even when the groove is expanded to its predetermined maximum allowed distance.

Figure 9:
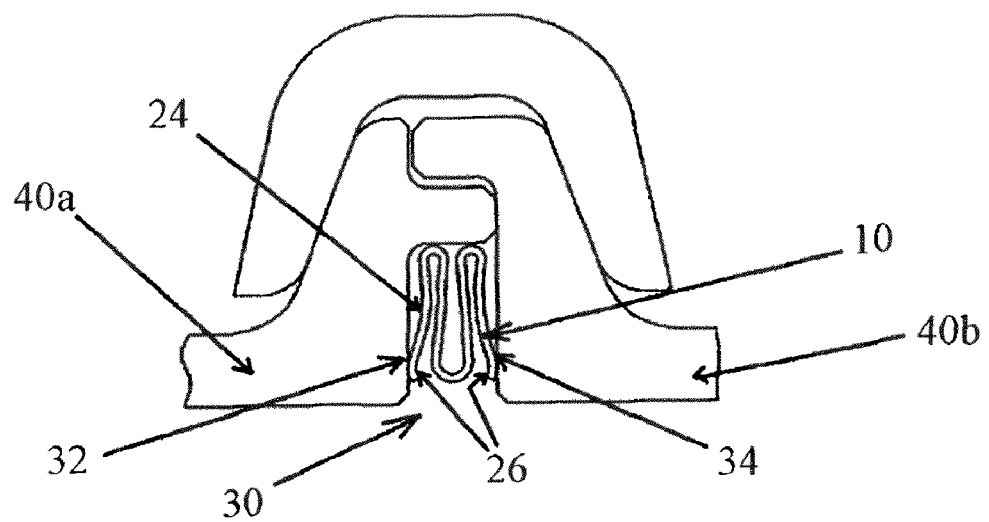
FIG. 9 is a non-deformed ducting joint with the seal according to the present invention.
Figure 10:
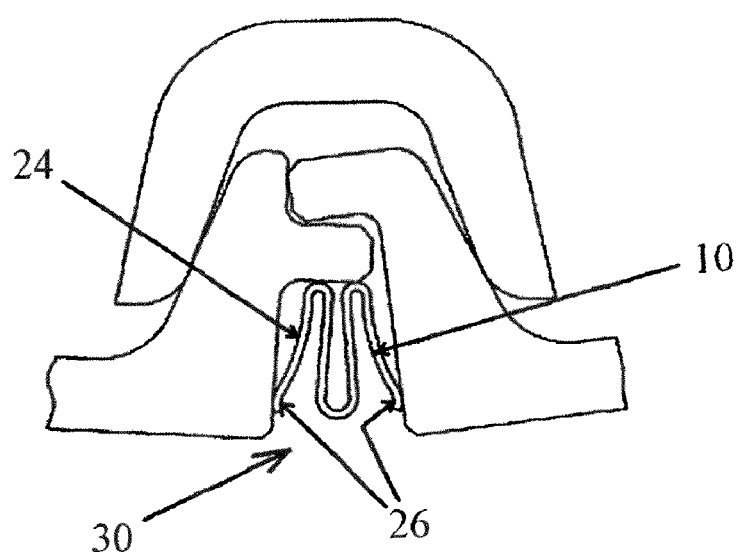
FIG. 10 is a maximum deformed ducting joint with the seal according to the present invention.

FIGS. 9 and 10 depict seal 10 in groove 30 formed by the contact of ducting joints 40a, 40b. The outer legs 24 include a leg end portion 26 opposite the bight portion 22 which includes a curved portion terminating inward towards central axis 50. The curved portion presses against groove surfaces 32, 34 to seal the outer legs to groove surfaces 32, 34.

It was discovered to be possible for a seal with reduced material thickness, resulting in lower deflection stresses, to withstand the highest pressure requirements both in normal and weld-deformed flange face regions by reducing the height of the seal section adjacent to the outside diameter of the seal, i.e., the heel, so that contact between that region and the flange sealing faces can never occur and by using a deeper convolution terminating in a large radius for a more bulbous appearance. At the same time, the free height of the seal could be increased to ensure initial sealing contact with all areas of the deformed flanges while the single-ply seal remains flexible (soft) enough to allow normal hand closing of the coupling over the flange pair to facilitate installation. Essentially, unlike the prior art of thicker or multi-ply seals, deformation of the joint does not degrade the integrity of the seal of the present invention.

Moreover, unlike the prior art, in at least one embodiment of the present invention, the center convolution section extends beyond the depth of each outer leg. It was previously not considered possible to use this type of seal for high pressure systems, such as bleed-air ducting, because the stresses in the end radii induced by pressure would have been far in excess of the properties of available materials. The adjustments of center curvature length and curvature circumference in combination with the V-shaped flaring of the outer legs makes it possible to take advantage of the additional deflection capability of the longer convolution by ensuring sidewall curvature in response to seal compression, which improves stress distribution and avoids stress concentrations in the inner and outer radii.

Figure 1:
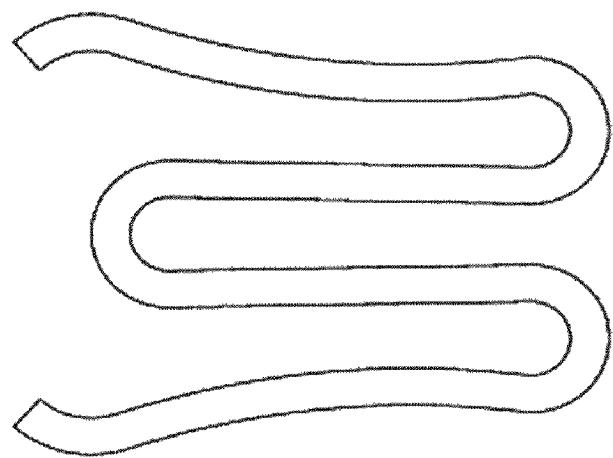
FIG. 1 is a cross-sectional view of a basic pneumatic E-seal of the prior art.
Figure 2:
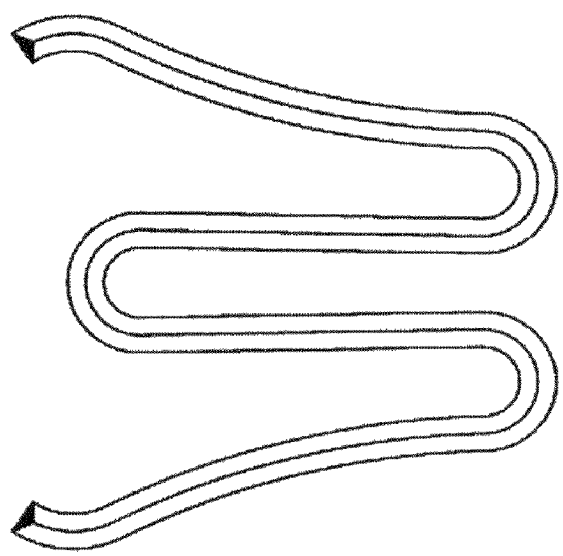
FIG. 2 is a cross-sectional view of a two-ply E-seal of the prior art.
Figure 3:
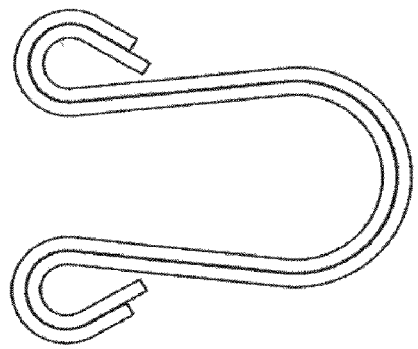
FIG. 3 is a cross-sectional view of a U-PLEX seal of the prior art.
Figure 4:
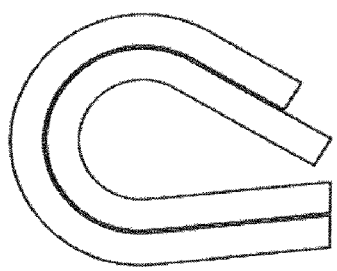
FIG. 4 is a cross-sectional view of a portion of the U-PLEX seal of FIG. 3.
Figure 5:
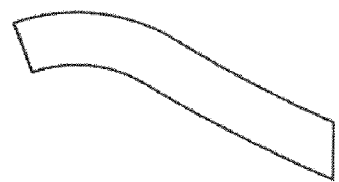
FIG. 5 is a cross-sectional view of a portion of the V/E-seal of FIG. 8.
Figure 6:
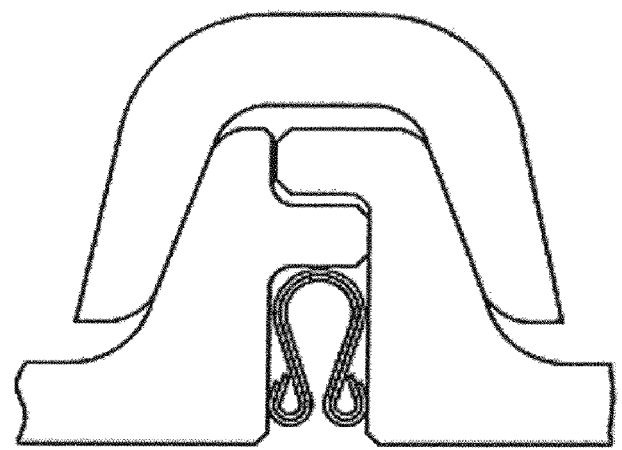
FIG. 6 is a non-deformed ducting joint with the U-PLEX seal of FIG. 3
Figure 7:
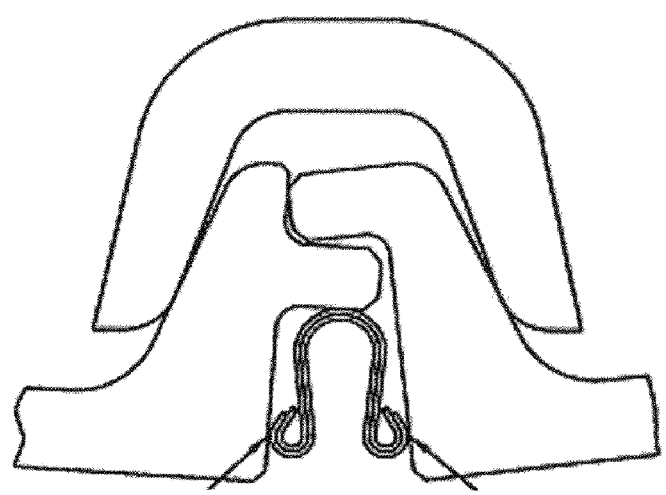
FIG. 7 is a maximum deformed ducting joint with the U-PLEX seal of FIG. 3.

The present invention reaches an unanticipated result in a field thoroughly explored for twenty-years. The new teaching is that a single-ply or single thickness of material thinner than previously supposed is capable of containing pressure to a higher level, through the redistribution of strain-energy into a feature not fully exploited in earlier work. The reduced thickness providing a lower stress-deflection ratio and permitting a higher free (initial, uncompressed) height. As an example, a comparison of the circumferential stiffness of the end leg portion of the U-PLEX seal of FIG. 3 was made to the end leg portion seal of FIG. 8 (K∞Elxx). FIG. 4 is a cross-sectional view of a portion of the U-PLEX seal of FIG. 3 with lxx=0.0002791. In contrast, FIG. 5 is a cross-sectional view of a portion of the V/E-seal of FIG. 8 with lxx=0001202.

Although there have been myriad combinations of leg and convolution shapes and sizes in custom E-Seal designs, there has always been a tendency for the heel of the seal to spring open as the legs are compressed. This limits the deflection capability of the seal because as soon as contact is established between the heel and the cavity/gland faces the primary sealing forces diminish while the stress rapidly increases at the heel.

The present invention includes a method of configuring the cross-section of a convoluted seal so that its heels do not lift into contact with the flange faces, and in which the central convolution walls are arcuately deflected to provide a reduction in the rate of stress increase in relation to deflection, or compression of the seal height as compared to that of earlier, prior art seals. Finite Element Analysis (FEA) von Mises stress plots dramatically illustrate this result. These plots are analytically derived. Colored enlargements of the axis-symmetric Finite Element Analysis von Mises stress plots are included in the drawings, specifically FIGS. 11-18, to show the stress regions in further detail and to provide more detailed readability.

Seal Compressed to Minimum Cavity Depth

Figure 11:
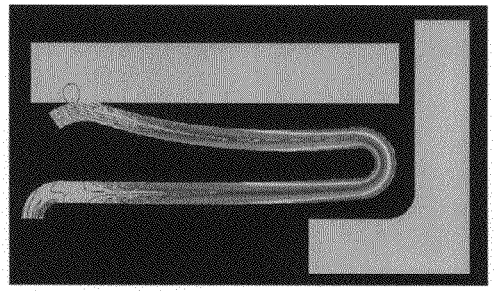
FIG. 11 is an FEA von Mises stress plot of a portion of the seal with the seal compressed to minimum cavity depth.
Figure 13:
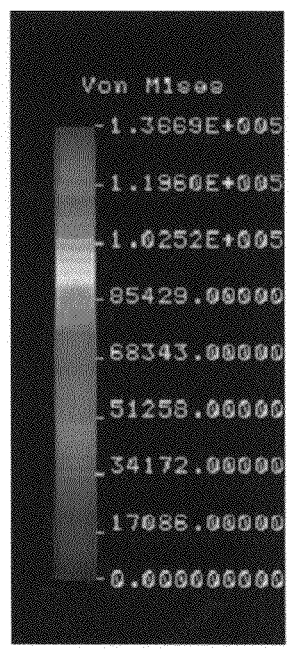
FIG. 13 is the legend for the stress plot shown in FIG. 11.

FIG. 11 is a Finite Element Analysis von Mises stress plot of a portion of the seal of the present invention with the seal compressed to minimum cavity depth in conformance with SAE AS 1895/23-400 High Conformance Seal, Type I & II Standard and Low Profile requirements. As indicated in this nonlinear axisymmetric stress plot, there is clearance between seal and cavity face, and curvature of the convolution wall for a seal cut on a plane of symmetry. In the installed condition, the seal free height is 0.134 inches compressed to 0.086 inches. FIG. 13 is the legend for the stress plot of FIG. 11 depicting stress in lbs/in².

Seal at Maximum Operating Conditions: 670 PSIG at 1200° F.

Figure 12:
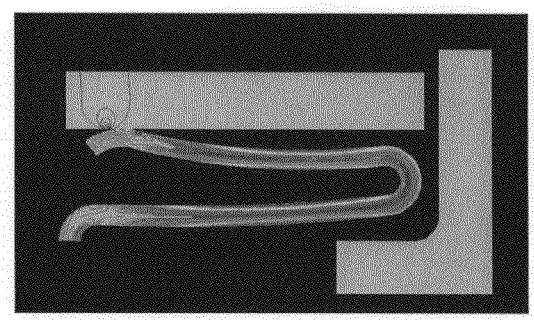
FIG. 12 is an FEA von Mises stress plot of a portion of the seal with the seal compressed to minimum cavity depth and exposed to maximum operating conditions: 670 psig at 1200° F.
Figure 14:
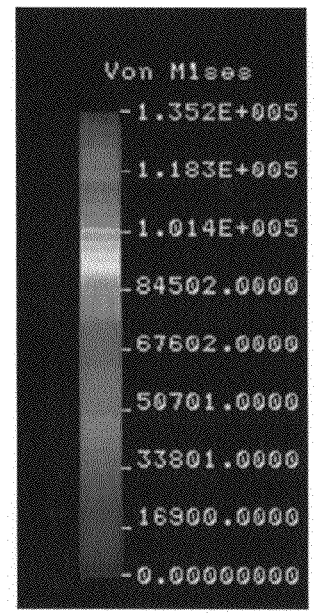
FIG. 14 is the legend for the stress plot shown in FIG. 12.

FIG. 12 is a Finite Element Analysis von Mises stress plot of a portion of the seal of the present invention with the seal at maximum operating conditions of 670 PSIG at 1200° F. in conformance with SAE AS 1895/23-400 High Conformance Seal, Type I & II Standard and Low Profile requirements. The higher stresses are exhibited on the outer legs and inner or central convolution walls. As depicted, the present design is analytically shown to be far more elastic than the prior art seals, in part because of the wide-tipped center convolution that reduces the combined pressure and flexure stresses. In this manner, designs thinner that that employed in the prior art may be used without any reduction in pressure rating. FIG. 14 is the legend for the stress plot of FIG. 12 depicting stress in lbs/in².

Furthermore, as depicted in FIGS. 11 and 12, the V/E-seal of the present invention does not exhibit secondary sealing lines during compression. Thus, stress-increasing secondary contact is avoided under all operating conditions.

The seal does not rely on a pressure differential becoming sufficiently high enough to inflate it. In this manner, it seals immediately by virtue of its adequate free-height and initial contact pressure from deflection.

Seal at Proof Test Conditions: 1340 PSIG at 1200° F.

Figure 15:
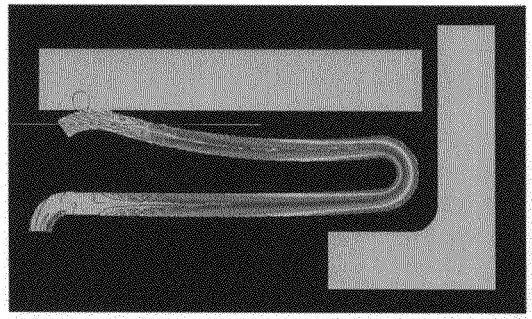
FIG. 15 is an FEA von Mises stress plot of a portion of the seal with the seal compressed to minimum cavity depth and at proof conditions: 1340 psig at 1200° F.
Figure 17:
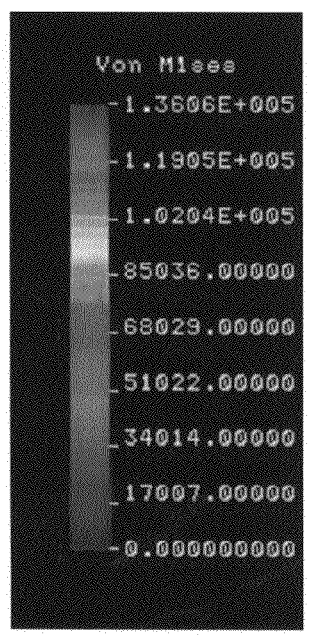
FIG. 17 is the legend for the stress plot shown in FIG. 15.

FIG. 15 is a Finite Element Analysis von Mises stress plot of a portion of the seal of the present invention with the seal at proof test conditions of 1340 PSIG at 1200° F. in conformance with SAE AS 1895/23-400 High Conformance Seal, Type I & II Standard and Low Profile requirements. FIG. 17 is the legend for the stress plot of FIG. 15 depicting stress in lbs/in². The high stress is designed to be realized at the heel.

Seal Springback After Proof Test

Figure 16:
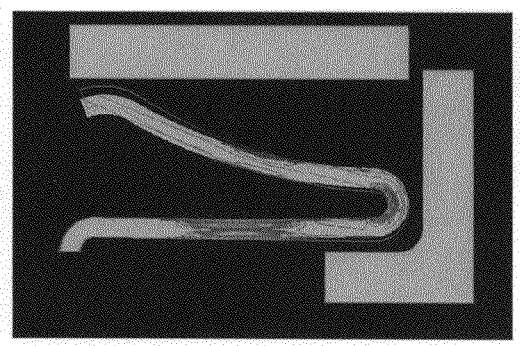
FIG. 16 is an FEA von Mises stress plot of a portion of the seal with the seal uncompressed and after proof test: 0.041 inches.
Figure 18:
FIG. 18 is the legend for the stress plot shown in FIG. 16.

FIG. 16 is a Finite Element Analysis von Mises stress plot of a portion of the seal of the present invention with the seal at its springback position after a high temperature proof test at 1340 PSIG, 1200° F., and 0.041 inches, in conformance with SAE AS 1895/23-400 High Conformance Seal, Type I & II Standard and Low Profile requirements. FIG. 18 is the legend for the stress plot of FIG. 16 depicting stress in lbs/in². Thus, as depicted, this seal has ample compression capability for re-use. For example, it has more than twice the capability of the prior art U-PLEX seal.

The AS1895/23-400 proof test conditions used in this analysis, 1340 PSIG at 1200° F., are intended to explore the full capability of the V-joint, and are higher than those based on current industry service conditions but will be sufficient to ensure dip contact at operating conditions. The −400 test has the highest operating and test requirements. At current maximum proof test conditions springback would be 100% of applied compression.

Seals of the present invention will sometimes be required for external high differential pressures. These variants will be manufactured inside-out, namely with their open diameters/leg ends facing outward.

As is the case for all resilient metallic seals for 1200° F. applications made in nickel alloy 718, seals of this invention will undergo stress relaxation in service. The degree of stress relaxation depends upon the stress and actual metal temperature extant in a given location, the least degree being advantageously in the flange dip regions. It would be possible to produce seals in Waspaloy or Super 718 to reduce stress relaxation but the small benefits in leakage reduction to be gained are not regarded as either cost-effective or necessary by the aerospace community.

Alloy 718 Seal Compressed to Minimum Cavity Depth

Figure 19:
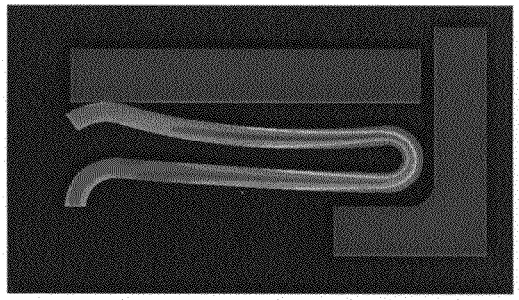
FIG. 19 is a second FEA von Mises stress plot of a portion of a 718 alloy seal with the seal compressed to minimum cavity depth.
Figure 21:
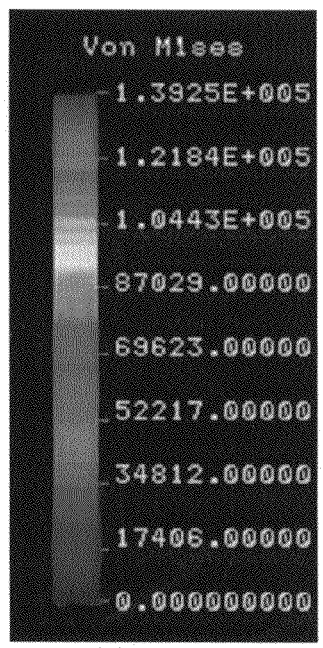
FIG. 21 is the legend for the stress plot shown in FIG. 19.

In another analysis set, the FEA stress plots were performed on seals of nickel alloy 718. FIG. 19 depicts a seal compressed to minimum cavity depth, with a free height of 0.134 inches with an alloy 718 thickness of 0.008 inches. The seal is installed at a minimum cavity depth of 0.086 inches. FIG. 21 is the legend for the stress plot of FIG. 19 depicting stress in lbs/in². Depicted in FIG. 19 is the clearance between the seal and the cavity face, as well as the curvature of the convolution wall in this axis-symmetric stress plot for a seal cut on a plane of symmetry.

Alloy 718 Seal at Maximum Operating Conditions

Figure 20:
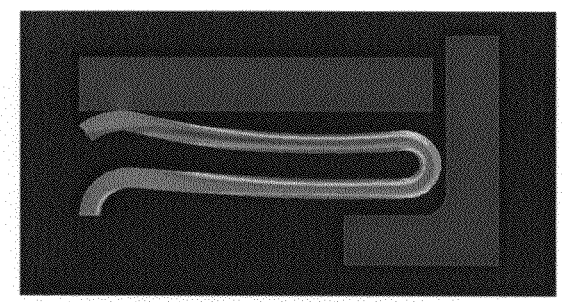
FIG. 20 is a second FEA von Mises stress plot of a portion of a 718 alloy seal with the seal compressed to minimum cavity depth and exposed to maximum operating conditions: 670 psig at 1200° F.
Figure 22:
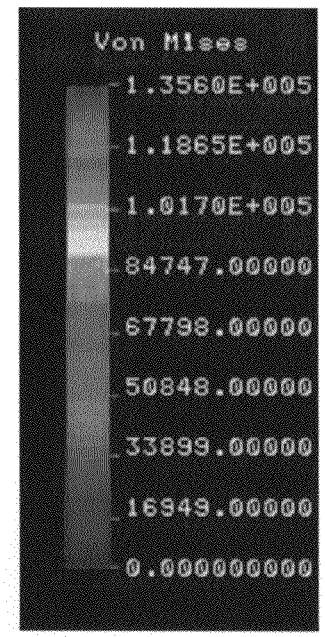
FIG. 22 is the legend for the stress plot shown in FIG. 20.

FIG. 20 depicts the 718 alloy seal at maximum operating conditions of 670 PSIG at 1200° F. with the seal installed at a minimum cavity depth of 0.086 inches. FIG. 22 is the legend for the stress plot of FIG. 20 depicting stress in lbs/in².

Alloy 718 Seal at Proof Test Conditions

Figure 23:
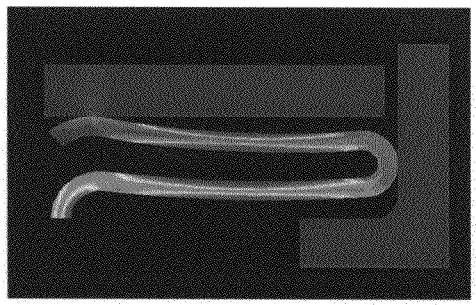
FIG. 23 is a second FEA von Mises stress plot of a portion of the seal with the seal compressed to minimum cavity depth and at proof conditions: 1340 psig at 1200° F.
Figure 25:
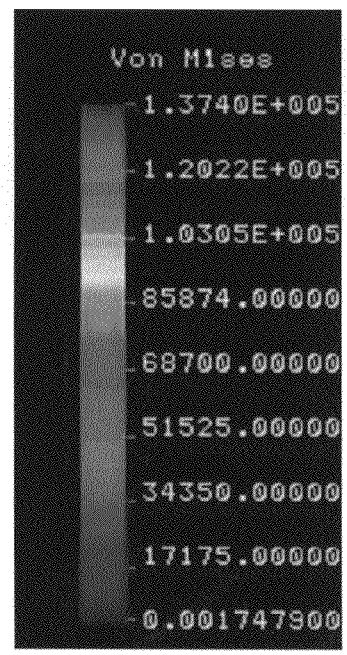
FIG. 25 is the legend for the stress plot shown in FIG. 23.

FIG. 23 depicts a 718 alloy seal of the present invention at proof test conditions of 1340 PSIG and 1200° F. with flanges have two aligned dips of 0.018 inches. FIG. 25 is the legend for the stress plot of FIG. 23 depicting stress in lbs/in².

Alloy 718 Seal Springback After Proof Test

Figure 24:
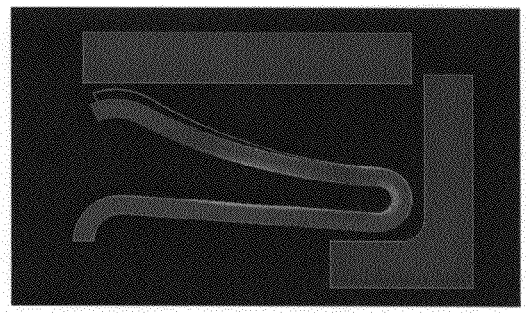
FIG. 24 is a second FEA von Mises stress plot of a portion of the seal with the seal uncompressed after proof test: 0.039 inches.
Figure 26:
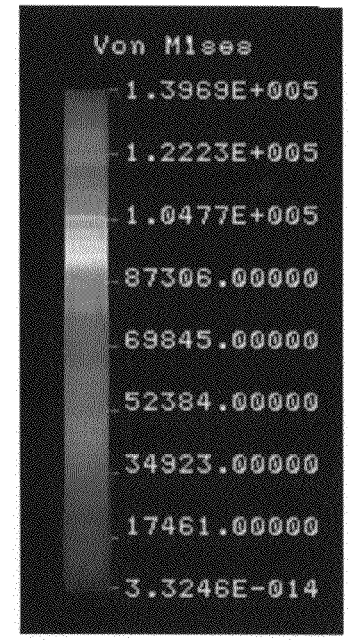
FIG. 26 is the legend for the stress plot shown in FIG. 24.

FIG. 24 depicts a 718 alloy seal springback test results after a proof test of 1340 PSIG at 1200° F. for a seal with flanges having two aligned dips of 0.018 inches. The springback is analytically determined to be approximately 0.039 inches. FIG. 26 is the legend for the stress plot of FIG. 24 depicting stress in lbs/in². Again, it is shown that the seal of the present invention has ample compression capability for re-use. It has more than twice the capability of the U-PLEX seal.

The present invention details salient features for a lighter, more robust seal than the multi-ply versions found in the prior art. By adjusting the flare of the outer legs to make the outer profile of the seal more V-shaped, adjusting the circumferential curvature of the bulbous center section as well as the specific circumferential curvature changes to each heel to displace the stress and/or strain when the seal is under compression forces, and allowing the depth of the center curvature section to exceed the axially-projected length of each outer leg, the seal of the present invention is distinctly different from those of the prior art, and substantially more effective for sealing flanges in high temperature, high stress aerospace applications, even in a single-ply construction.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A seal for sealing when positioned within a groove in a compressed state comprising:
   a cross-section with a central axis;
   a center curved region extending symmetrically across said central axis;
   a pair of central legs, each central leg having a first end connected to opposing ends of said center curved region and a second end connected to a first end of a heel, said central legs angling inwards from said center curved region towards said central axis to form a bulbous-shaped center curved region;
   a pair of opposing outer legs, each outer leg connected to a second end of said heel and extending outwards from said heel and from said central axis sufficient for said outer legs to contact opposite surfaces of said groove in which said seal is placed and forming a V-shape to said cross-section outer dimensions, each of said opposing outer legs including an inflection region curving inwards towards said central axis leg end portion opposite said heel that forms an angle to said central axis sufficient for opposing leg end portions to span said groove in which said seal is placed without having said outer leg inflection region come in contact with said central leg when said seal is in said compressed state, said pair of opposing outer legs connected at said heel to form a narrow portion of said V-shape such that the outer legs at the heel cannot contact said groove; and
   an inwardly terminating curved portion on each of said outwardly angled opposing outer legs;
   wherein said center curved region extends along said central axis a greater distance than the projection of said outer legs on said central axis; and
   wherein the central legs angle inward sufficient to allow each outer leg to contact the groove at only one point.

2. The seal of claim 1 wherein said seal comprises a single-ply construction of resilient metal.

3. The seal of claim 1 wherein said seal comprises an integral piece of resilient metal in a ring shape.

4. The seal of claim 1 wherein said center curved region bulbous shape is formed by adjoining central legs, and has a circumferential curvature greater than 180 degrees to angle said central legs second end inwards towards each other without contacting each other.

5. The seal of claim 1 wherein said outer leg inflection regions are located approximately midpoint of each of said leg region.

6. The seal of claim 1 wherein said heel circumferential curvature angle is less than said center curved region circumferential curvature angle.

7. The seal of claim 1 wherein each of said outer leg defines a V-shaped gap with said adjacent central leg so that when said seal is in a compressed state, said outer leg inflection regions do not contact said adjacent central leg.

8. The seal of claim 1 wherein said inwardly terminating curved portion includes a sinuous configuration of a convex section and a concave section.

9. The combination of the seal of claim 1 with a pair of relatively movable flange members which define between them a cavity in which high pressures and temperatures are encountered while said flange members are moved into engagement.

10. A sealing ring for sealing within a groove comprising:
    an integral piece of resilient metal, approximately E-shaped in radial cross-section about a central axis;
    inner legs symmetric about said central axis joined at a bottom end to a curved bottom section having a circumferential curvature of greater than 180 degrees such that said inner legs flare towards said central axis, each of said inner legs terminating in separate curved heel sections at a second end;
    said heel sections having a circumferential curvature less than said curved bottom section;
    outward legs each having an inflection region curved towards said central axis and attached to respective heel sections such that said outward legs flare outwards relative to said central axis, said outer legs at the heel substantially narrower than where said outer legs flare outwards, such that said outer legs at the heel cannot contact said groove; and
    a curved end section on each of said outward legs curved in a direction opposite said inflection region towards said central axis;
    wherein said center curved region extends along said central axis a greater distance than the projection of said outer legs on said central axis; and
    wherein the central legs angle inward sufficient to allow each outer leg to contact the groove at only one point;
    said seal ring forming a seal in a compressed state in such a manner that said inner legs and said outer legs do not touch when said seal is compressed between movable flange members which define between them a cavity when said flange members are moved into engagement.

11. The seal of claim 10 wherein said seal comprises a single-ply construction.

12. The seal of claim 10 wherein said outer leg inflection regions are located approximately midpoint of each of said leg region.

13. The seal of claim 10 wherein said curved end sections include a sinuous configuration of a convex section and a concave section.

* * * * *